United States Patent [19]
Yoshida et al.

[11] Patent Number: 5,735,015
[45] Date of Patent: Apr. 7, 1998

[54] WIPER APPARATUS FOR VEHICLES

[75] Inventors: Shuntaro Yoshida, Oobu; Toshiichi Sawada, Kariya; Kazuma Matsui, Toyohashi; Masahiko Suzuki, Hoi-gun; Masanori Sugiura, Chiryu, all of Japan

[73] Assignee: Nippondenso Co., Ltd., Kariya, Japan

[21] Appl. No.: 790,308

[22] Filed: Jan. 28, 1997

Related U.S. Application Data

[63] Continuation of Ser. No. 278,231, Jul. 27, 1994, abandoned.

[30] Foreign Application Priority Data

| Jul. 22, 1993 | [JP] | Japan | 5-181604 |
| Oct. 14, 1993 | [JP] | Japan | 5-257041 |

[51] Int. Cl.$^6$ .................. B60S 1/34; B60S 1/16
[52] U.S. Cl. .............. 15/250.34; 15/250.3; 15/250.31; 403/225
[58] Field of Search ............ 15/250.34, 250.35, 15/250.2, 250.31, 250.3, 250.351, 250.352; 403/372, 228, 225

[56] References Cited

U.S. PATENT DOCUMENTS

| 2,032,900 | 3/1936 | Alger | 403/372 |
| 2,178,077 | 10/1939 | Loftis | 403/228 |
| 2,187,923 | 1/1940 | Winkleman | 403/225 |
| 3,085,821 | 4/1963 | Ryck | 15/250.34 |
| 3,102,295 | 9/1963 | Reese | 15/250.352 |
| 3,261,215 | 7/1966 | Simpson | 15/250.3 |
| 4,361,927 | 12/1982 | Matsui et al. | 15/250.42 |
| 4,765,018 | 8/1988 | Buchanan | 15/250.13 |
| 4,984,928 | 1/1991 | Domer | 403/372 |
| 5,175,903 | 1/1993 | Curtis | 15/250.34 |

FOREIGN PATENT DOCUMENTS

| 021914 | 1/1981 | European Pat. Off. . |
| 957967 | 3/1950 | France . |
| 4324828 | 1/1994 | Germany . |
| 58-20951 | 2/1983 | Japan . |
| 62-131845 | 6/1987 | Japan . |
| 3-36452 | 8/1991 | Japan . |
| 4-81346 | 3/1992 | Japan . |
| 4183658 | 6/1992 | Japan | 15/250.34 |
| 4208663 | 7/1992 | Japan | 15/250.34 |
| 410282 | 5/1934 | United Kingdom | 403/228 |
| 411622 | 6/1934 | United Kingdom | 403/228 |
| 608830 | 9/1948 | United Kingdom | 15/250.31 |
| 614204 | 12/1948 | United Kingdom | 15/250.34 |
| 1445666 | 8/1976 | United Kingdom . |

*Primary Examiner*—Gary K. Graham
*Attorney, Agent, or Firm*—Cushman Darby & Cushman IP Group of Pillsbury Madison & Sutro LLP

[57] ABSTRACT

A wiper assembly has an arm head which reciprocates with respect to a center line of a wiper arm by receiving motive force from a reciprocating rod. An elastic component is coaxially provided proximate to the center of rotation. When the coefficient of friction between the wiper blade and the windshield surface is inversely proportional to the speed of the wiper blade causing self-induced vibration in certain circumstances, the wiper blade tends to screech, skip or chatter across the windshield surface. Such vibration is suppressed by the elastic component, thereby permitting smooth reciprocal motion of the wiper assembly.

13 Claims, 17 Drawing Sheets

WIPER APPARATUS FOR VEHICLES

This is a continuation of application Ser. No. 08/278,231, filed on Jul. 21, 1994, which was abandoned upon the filing hereof.

BACKGROUND OF THE INVENTION

1. Field of the Invention

This invention relates to a wiper apparatus for vehicles to clean windows of vehicles.

2. Description of the Related Art

A conventional wiper apparatus for vehicles cleans a window glass surface by changing the driving force of a motor to a reciprocation movement of a wiper blade mounted on one end of a wiper arm, via a link mechanism.

According to such a conventional wiper apparatus for vehicles, self-induced vibration occurs due to the fact that a coefficient of friction between the window glass and the wiper blade is inversely proportional to the movement speed of the wiper blade, and since this self-induced vibration becomes screeching, skipping or chattering type of vibration, there is the problem of an unpleasant sensation imparted to the driver or a passenger within the vehicle compartment.

Generally, when a wiper blade reciprocates over a window surface, if, for example a film of wax has been formed on the window surface, a non-uniform state of the coefficient of friction between the wiper blade and the window is formed, and so marked screeching vibrations between the wiper blade and window or the wiper arm and window are prone to occur. The occurrence of such screeching vibrations also caused by the coefficient of friction μ of the wiper blade with respect to the window glass surface and the wiper blade speed v are in an inversely proportional relationship, as is shown in FIG. 4.

In order to eliminate the unpleasant sensation based on this vibration, a method of suppressing occurrence of vibration by heightening rigidity of the wiper arm has been employed. According to this method, however, a vibration-reducing effect is not significant enough in proportion to the increased weight and higher production cost of the wiper arm.

SUMMARY OF THE INVENTION

An object of the present invention is to provide a wiper apparatus for vehicles which effectively reduces the unpleasant sensation imparted to the driver and passenger by suppressing screeching vibration of the wiper arm with low production cost.

To achieve the object the wiper apparatus for vehicles in one preferred mode has a wiper arm enabled to reciprocate; a drive mechanism driving said wiper arm; a driving force conveyance member conveying driving force of said drive mechanism to said wiper arm; a wiper blade connected to said wiper arm and enabled to reciprocate and slide over a surface of a window; means for generating a spring force and damping force which suppress self-induced vibration of said wiper arm by both conveying said driving force to said wiper arm and being deformed in a rotational direction of said wiper arm, said means for generating a spring force and damping force disposed on coaxial with the rotational center of said wiper arm. According to the construction of a wiper apparatus for vehicle use according to the present invention, because the construction is such that the elastic body is disposed coaxially with the rotational center of the link connection area of the driving force conveyance member, this elastic body is made to generate appropriate spring force and damping force in the direction of rotation of the link connection area, and so screeching vibration of the wiper arm can effectively be reduced.

Because of this, performing only a slight modification of the wiper arm or link section reduces noxious vibration of the wiper arm at low cost with no major change in the drive system and power conveyance system of a wiper system, thus enabling elimination of unpleasant sensations imparted to the driver and passenger.

3

Figure 16:
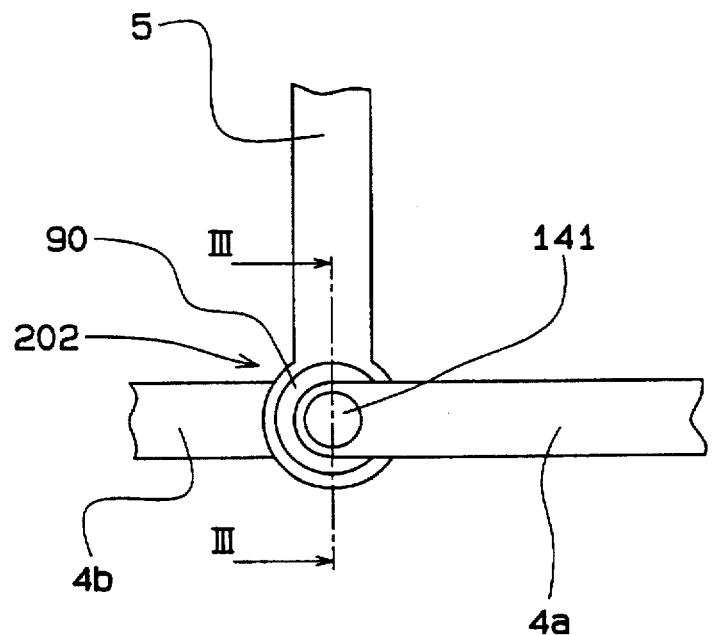
FIG. 16 is a plan view showing the major sections of the passenger seat side of a wiper apparatus for vehicles according to a seventh embodiment of the present invention.
Figure 17:
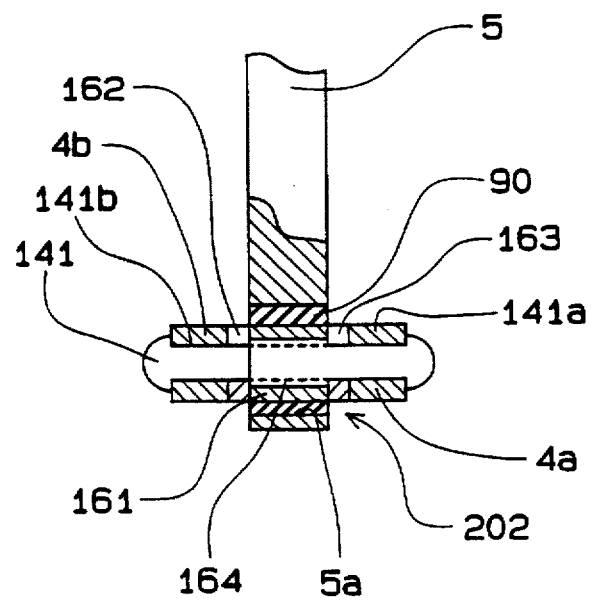
Figure 18:
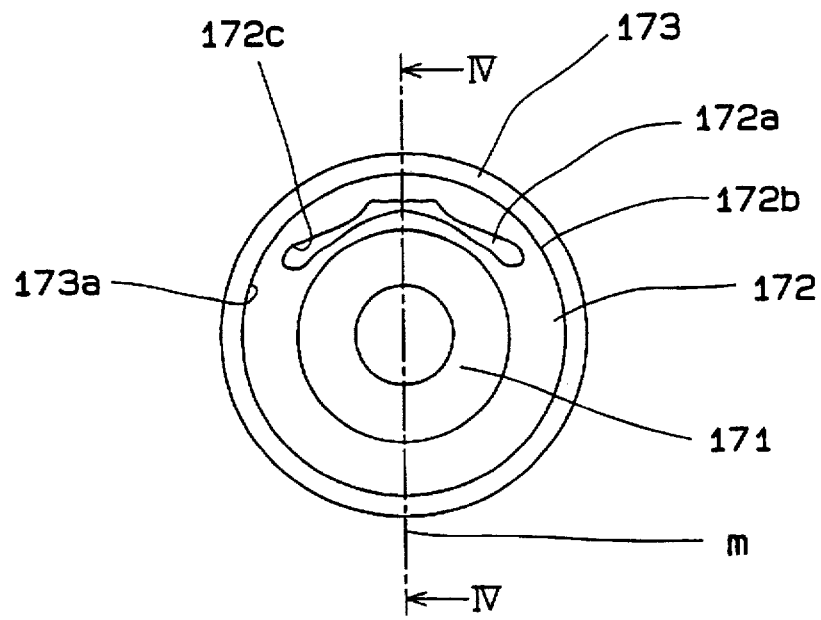
Figure 19:
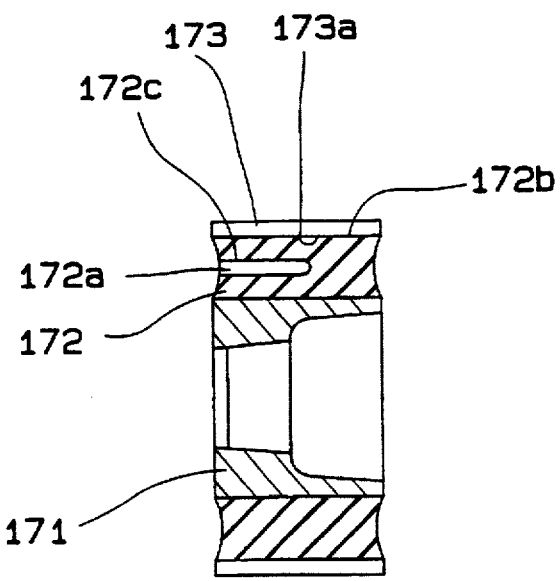
Figure 20:
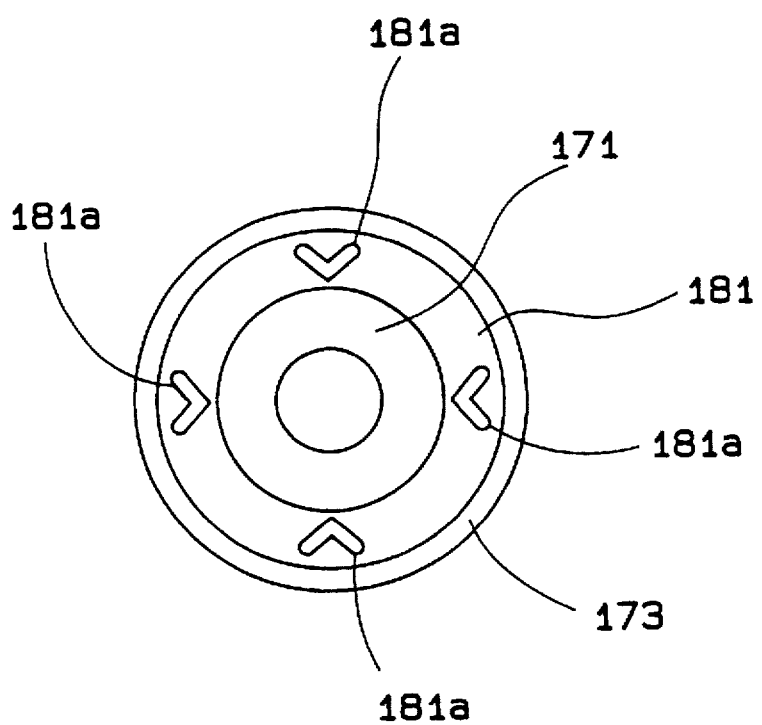
Figure 21:
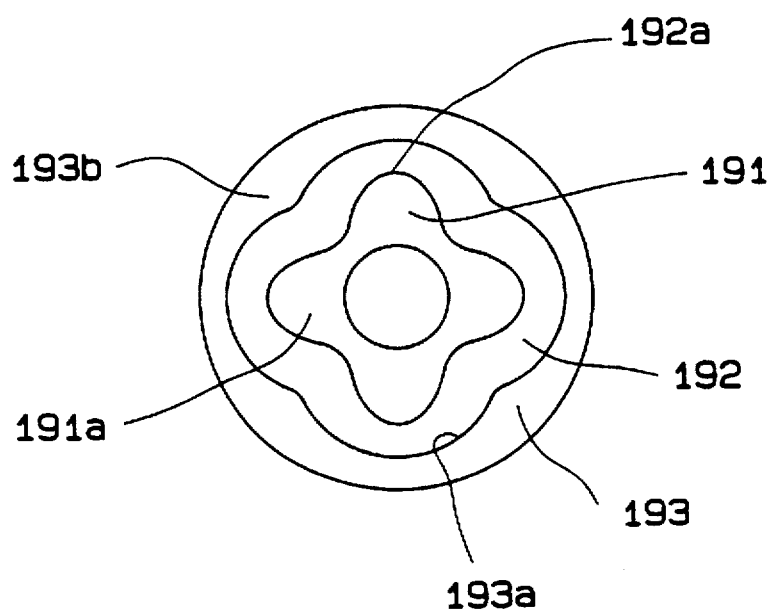

FIG. 17 is a sectional view taken along line III—III of FIG. 16;

FIG. 18 is a plan view showing the major sections of a wiper apparatus for vehicles according to an eighth embodiment of the present invention;

FIG. 19 is a sectional view taken along line IV—IV of FIG. 18;

FIG. 20 is a plan view showing the major sections of a wiper apparatus for vehicles according to a ninth embodiment of the present invention;

FIG. 21 is a plan view showing the major sections of a wiper apparatus for vehicles according to a tenth embodiment of the present invention.

DETAILED DESCRIPTION OF THE EMBODIMENTS

An embodiment according to the present invention will be described below with reference to the drawings.

Figure 1:
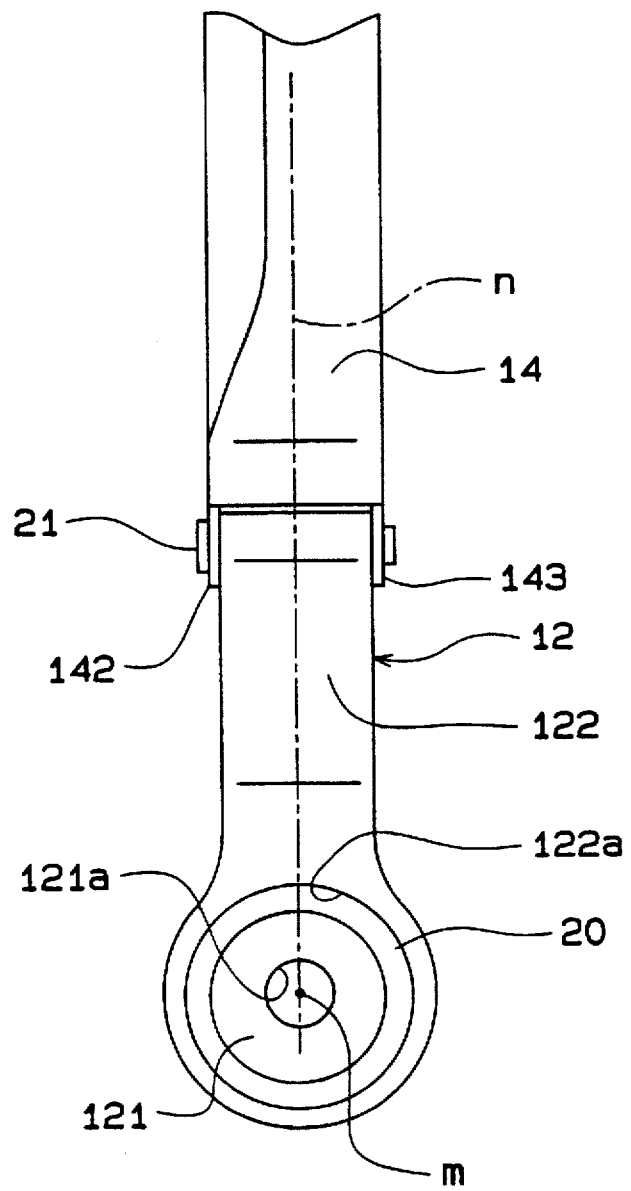
FIG. 1 is a plan view showing the major sections of a wiper apparatus for vehicles according to a first embodiment of the present invention.
Figure 2:
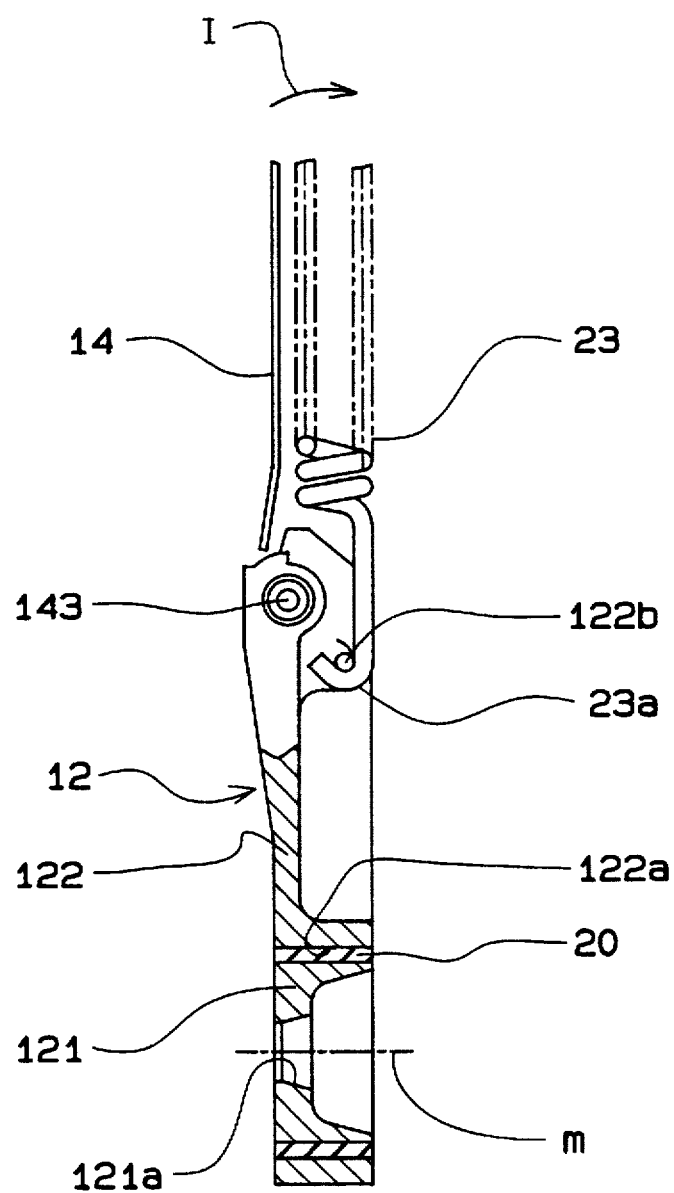
FIG. 2 is a partially cutaway side view showing the major sections of a wiper apparatus for vehicle use according to a first embodiment of the present invention.
Figure 3:
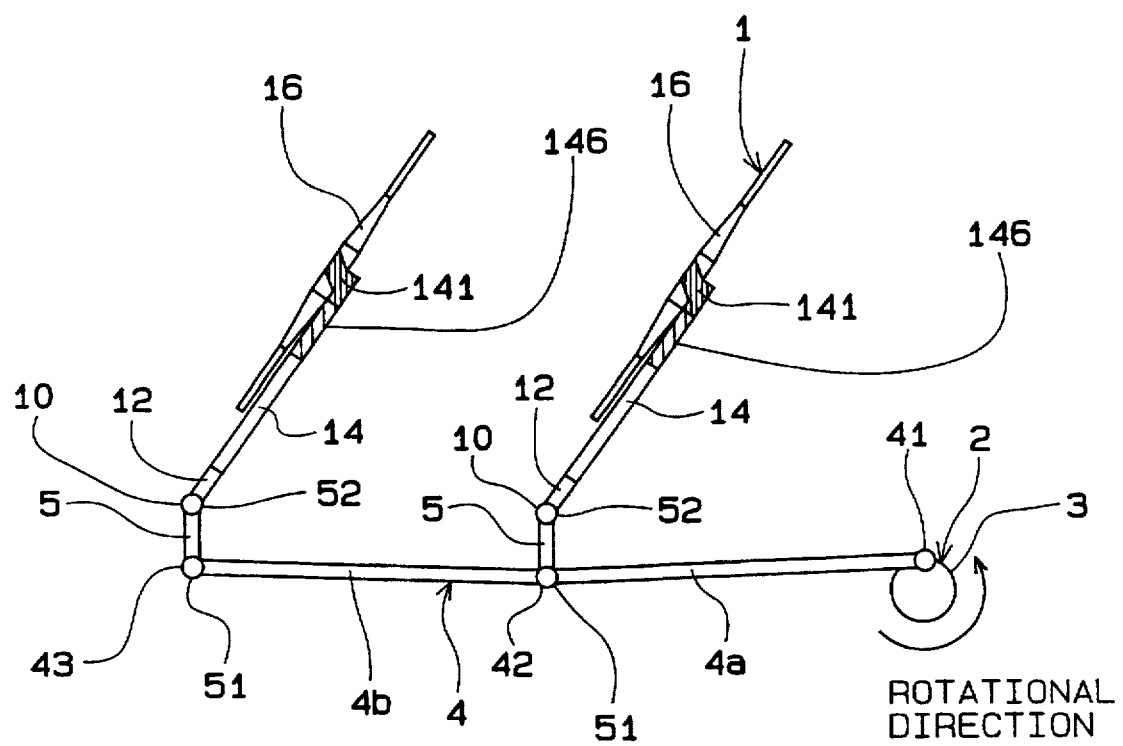
FIG. 3 is a perspective view showing a wiper apparatus for vehicles according to a first embodiment of the present invention.
Figure 4:
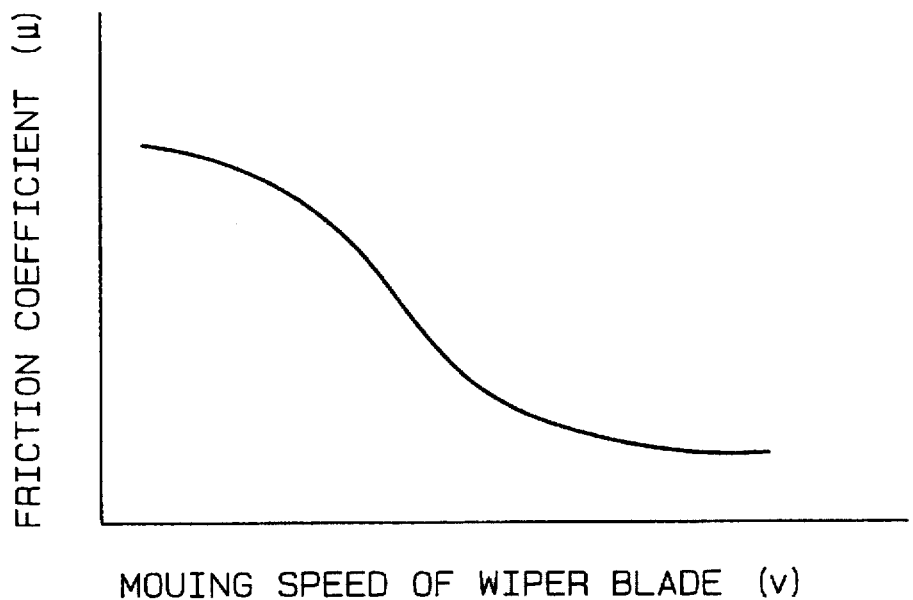
FIG. 4 is a characteristic diagram showing a relation between a coefficient of friction of for window surface and wiper blade speed.

A first embodiment of the invention is depicted in FIG. 1 to FIG. 3.

First, a schematic construction of a wiper apparatus for vehicles is depicted in FIG. 3. As shown in FIG. 3, a rod 4 is composed of a first rod 4a and a second rod 4b, and a wiper apparatus 1 is attached to a motor shaft of a motor 2. One end 41 of the first rod 4a is rotatably attached to an eccentric plate 3.

The center section 42 of the first rod 4a and second rod 4b is on the passenger seat side, one end 51 of a lever 5 is rotatably attached thereto, and the other end 52 of the lever 5 is rotatably attached to a fixed shaft 10 fixed to the vehicle body. Additionally, an arm head 12 fixed to the end 52 of the lever 5 is provided on the fixed shaft 10. A retainer 14 is fixed to the end of the arm head 12 on the diametrically outer side of the rotational center of the arm head 12 along the length of the arm, an arm piece 146 is fixed along the length of the retainer, and a wiper blade 16 is attached to an end 141 on the diametrically outer side of the rotational center of the arm piece 146.

One end 51 of a lever 5 is also similarly rotatably attached to another end 43 on the driver's seat side of the second rod 4b, and the other end 52 of the lever 5 is rotatably attached to a fixed shaft 10. Furthermore, an arm head 12 is fixed to the lever 5 in such a manner that the angle of rotation with respect to the lever 5 is constant and the arm head 12 is rotatably fixed to a fixed shaft 10. Additionally, a retainer 14, arm piece 146, and wiper blade 16 are also provided on the driver's seat side in a manner similar to that described above for the passenger seat side.

Next, the construction of the support section of the arm head 12 and the surroundings thereof will be described in detail with reference to FIG. 1 and FIG. 2.

The rotational centerline of the reciprocating arm head 12 is indicated by m, and the fixed shaft 10 shown in FIG. 3 which is fixed to the vehicle body is disposed at the position of this rotational centerline m. A mating hole 121a of a support section 121 of the arm head 12 is rotatably mated with this fixed shaft 10. An elastic rubber component 20 of tubular configuration is fixed to the outer periphery of this support section 121 by press-fitting it on coaxially with the rotational centerline m. On the outer periphery of this elastic rubber 20, an inner wall 122a of an arm section 122 of the arm head 12 is adhered to the outer wall of the elastic rubber 20. At the other end of the arm section 122, arms 142 and 143 of the retainer 14 are slidably fitted to both arm section side surfaces, and a pin 21 rotatably fixes the arm section 122 and the arms 142 and 143.

4

The retainer 14 pivots with respect to the arm section 122, on the axial center of this pin 21. In the state depicted in FIG. 2, the retainer 14 is urged by a tension coil spring 23 in the direction of arrow I shown in FIG. 2. One end 23a of the tension coil spring 23 is retained on a projection 122b formed on the arm section 122. By means of this tension coil spring 23 the wiper blade 16 shown in FIG. 3 which is attached to the arm piece 146 is pushed against the surface of a window not depicted.

During wiping operation, the eccentric plate 3 rotates in the direction of the arrow by means of the rotation of the motor 2, and along with this the first rod 4a and second rod 4b reciprocate toward the left and right as shown in FIG. 3, and the arm head 12 swings forward and rearward within a specified angle range, taking the rotational centerline m as the center. Along with this, the wiper blade 16 attached to the tip 141 of the arm piece 146 which is made integral with the retainer 14 attached to the tip of the arm head 12 reciprocates over the window surface. Consequently, the arm head 12, retainer 14, arm piece 146, and arm section 122 which constitute the wiper arm reciprocate with the rotational centerline m as the center.

Because the construction of the present embodiment is such that an elastic rubber 20 is provided coaxially proximate to the center of rotation m which becomes the rotational center of the wiper blade 16, when self-induced vibration arising from the fact that the coefficient of friction between the window glass and the wiper blade is inversely proportional to the movement speed of the wiper blade is about to be generated, elastic rubber 20 deforms and is made to generate an appropriate spring force and damping force so as to absorb the screeching vibration of the wiper blade 16. Because of this, the arm head 12 performs smooth reciprocating motion during wiping operation.

The relationship between motor drive voltage and motor output shaft speed is shown in the following Table 1.

TABLE 1

| Drive voltage (V) | 9 | 10 | 11 | 12 | 13 | 14 | 15 |
|---|---|---|---|---|---|---|---|
| Output shaft speed (rpm) | 30 | 33.3 | 36.7 | 40.0 | 43.3 | 46.7 | 50 |

As shown in the foregoing Table 1, drive voltage and output shaft speed are in a proportional relationship. This indicates that the speed of the wiper varies in a uniform relative relationship in accordance with the drive voltage of the motor.

Figure 5:
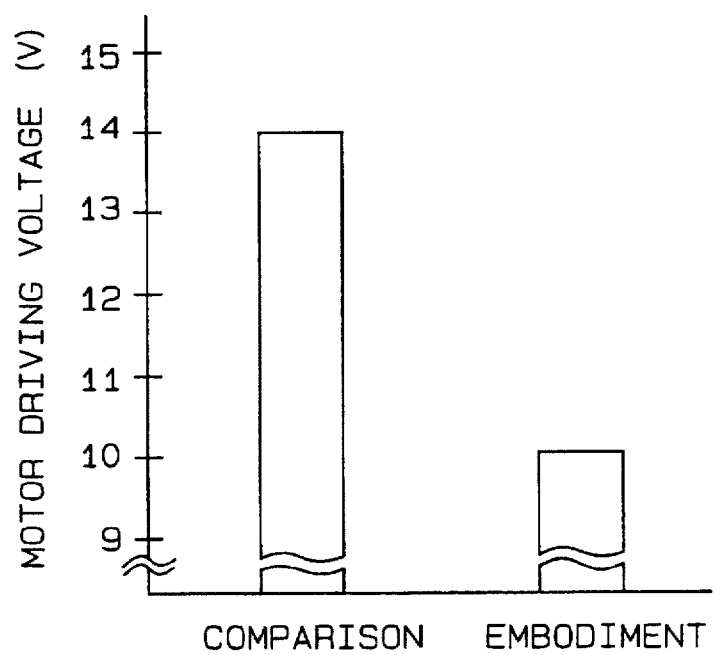
FIG. 5 is a characteristic diagram contrasting motor drive voltage and screeching elimination voltage of a comparative example of the conventional wiper apparatus and a first embodiment of the present invention.

The minimum voltage for eliminating screeching vibration of this wiper blade is shown in FIG. 5, which depicts testing results contrasting a comparative example according to the conventional wiper apparatus with an embodiment according to the present invention.

In FIG. 5, a wiper apparatus not provided with an elastic rubber on the support section of the arm head is used as the comparative example. The embodiment shown in FIG. 5 is a wiper apparatus having the elastic rubber 20 of the foregoing first embodiment. As can be understood from FIG. 5, the present embodiment can substantially eliminate screeching vibration of the wiper blade with a motor drive voltage which is considerably low in comparison with the comparative example.

Figure 6A:
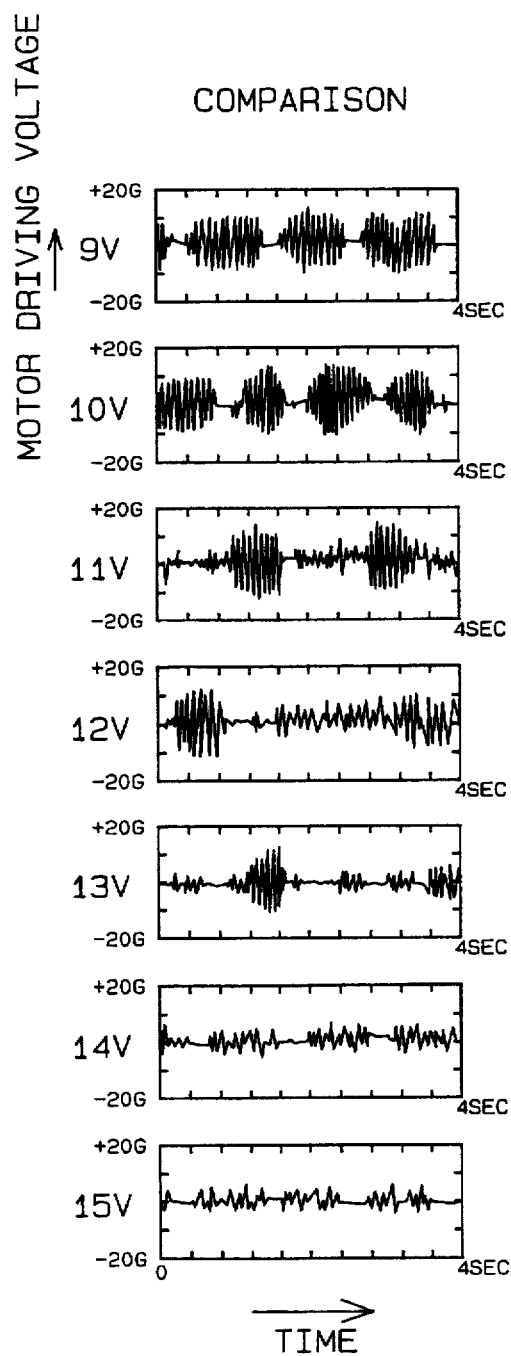
FIG. 6A is a characteristic diagram contrasting wiper blade center acceleration and motor drive voltage of a comparative example of the conventional wiper apparatus.
Figure 6B:
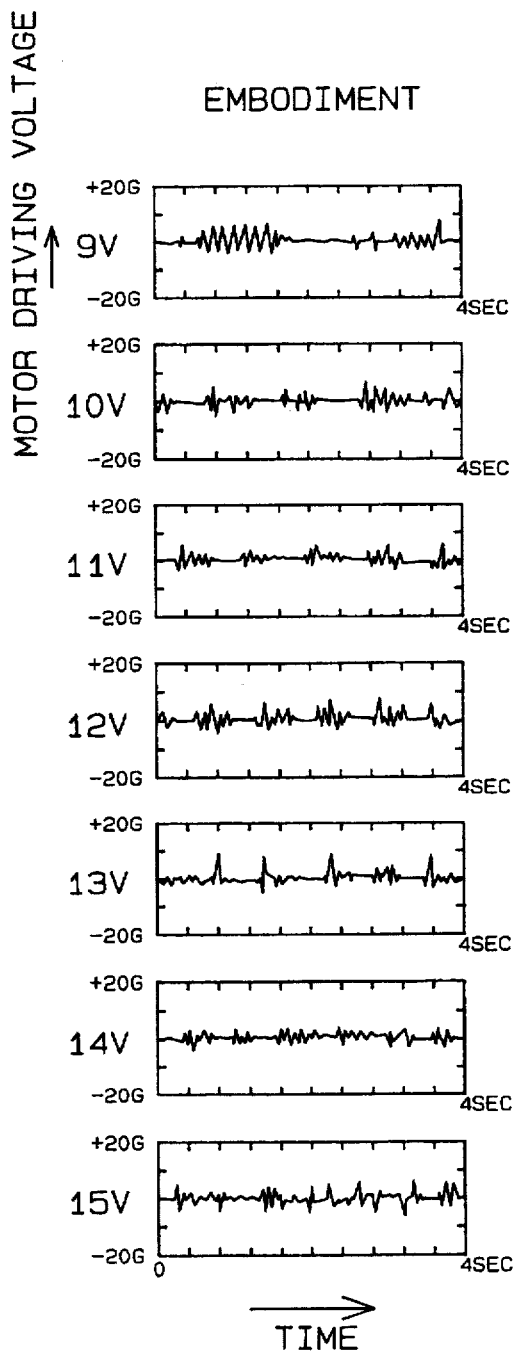
FIG. 6B is a characteristic diagram contrasting wiper blade center acceleration and motor drive voltage of a first embodiment of the present invention.

FIGS. 6A and 6B show test results contrasting changes over time of the center acceleration of wiper blades according to a comparative example not provided with an elastic rubber body on the arm head section of the wiper, and to the foregoing present embodiment, made by varying the drive voltage.

FIG. 6A shows the change in center acceleration of the wiper blade of the comparative example, and FIG. 6B shows the change in center acceleration of the wiper blade of the above-described first embodiment of the present invention.

When the comparative example and the first embodiment of the present invention are contrasted, it can be understood that, in the comparative example, a large amount of screeching vibration of acceleration of the wiper blade center is generated at a motor drive voltage of 9 to 13 V. In contrast to this, according to the foregoing first embodiment of the present invention, large screeching vibration of the blade center acceleration is slightly seen when motor drive voltage is only 9 V, but it can be understood that virtually no screeching vibration is observed at a drive voltage of 10 V or more. As can be understood from FIGS. 6A and 6B the first embodiment proved to be able to reduce screeching vibration of the wiper blade at a lower motor drive voltage than the comparative example. Furthermore, in the case of the first embodiment, because an elastic rubber body is uniformly disposed coaxially with the rotational center of the wiper arm, not only is sufficient damping force obtained, but because this damping force acts not in the direction of compression of the elastic body but in the direction of torsion, sufficient torsional displacement is obtained, screeching vibration can be alleviated and, along with this, superior durability is obtained because there is no sliding section.

Figure 7:
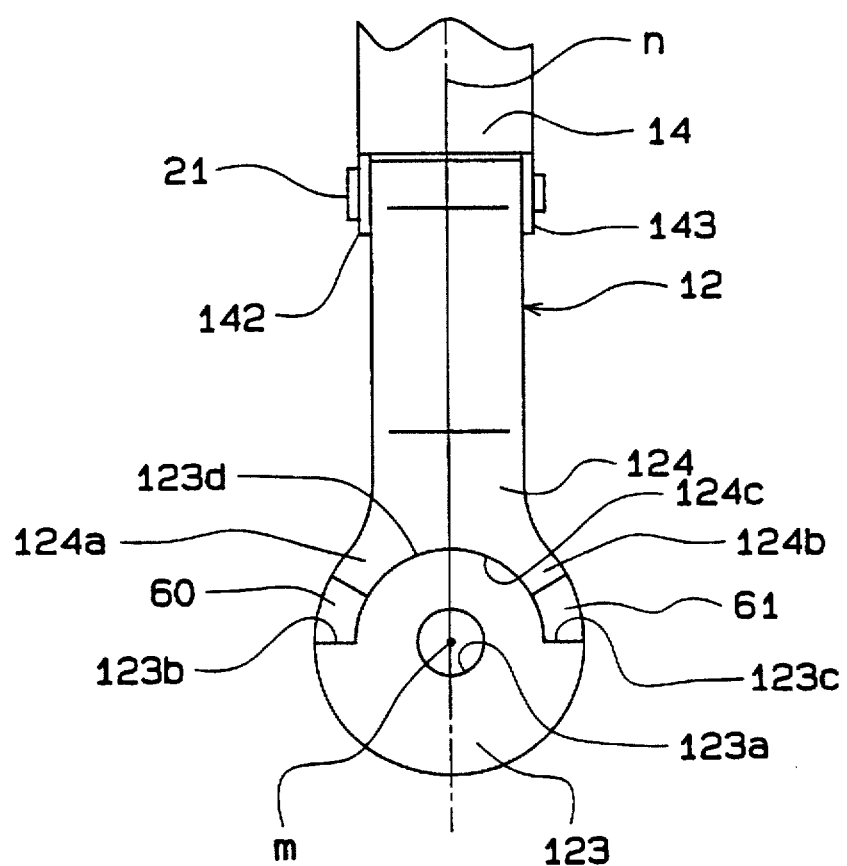
FIG. 7 is a partially plan view showing the major sections of a wiper apparatus for vehicles according to a second embodiment of the present invention.

A second embodiment of the present invention is shown in FIG. 7.

In the second embodiment shown in FIG. 7, a mating hole 123a of a support section 123 of an arm head 12 is rotatably mated with a fixed shaft having a rotational center m of the arm head 12. Elastic rubber components 60 and 61 are provided on shoulders 123b and 123c of this support section 123. The elastic rubbers 60 and 61 are coaxial with the wiper arm rotational centerline m and are disposed in symmetrical propositions with respect to the wiper arm axial centerline n. An arm section 124 of the arm head 12 is disposed so that an arc surface 124c is slidable over the arc outer wall 123d of the support section 123. Arms 124a and 124b of the arm section 124 oppose the shoulders 123b and 123c of the support section 123 via the elastic rubbers 60 and 61.

According to this second embodiment, because the elastic rubbers 60 and 61 are disposed in symmetrical positions with respect to the wiper arm axial centerline, the arm head 12 reciprocates smoothly even if variation in the coefficient of friction caused by variation in wiper center acceleration occurs.

Figure 8:
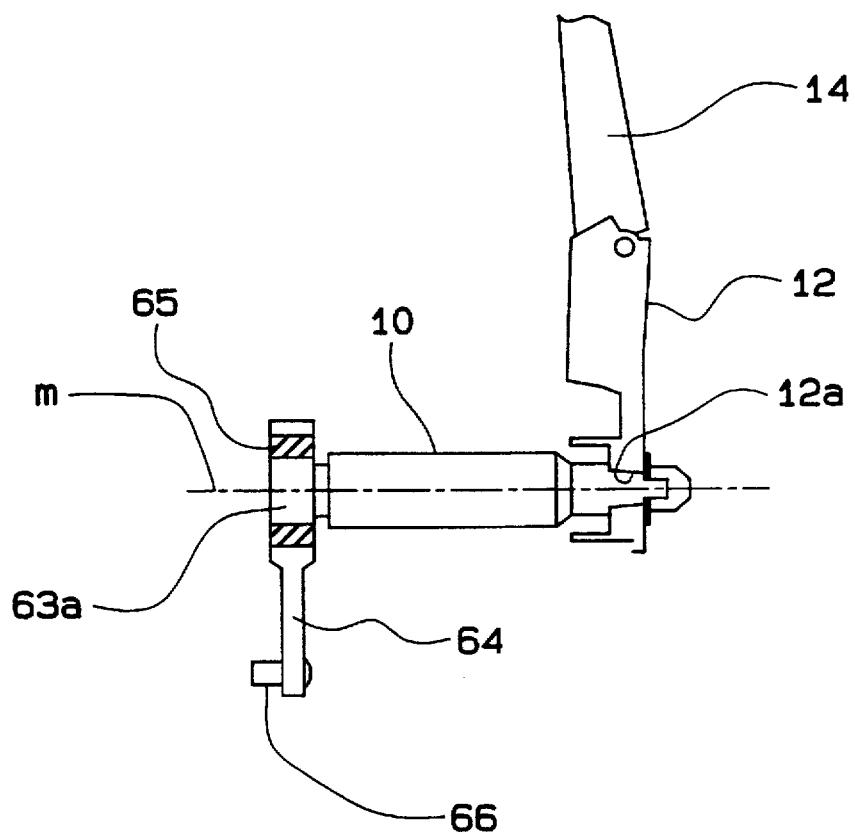
FIG. 8 is a partially cutaway side view showing the major sections of a wiper apparatus for vehicles according to a third embodiment of the present invention.

A third embodiment of the invention is shown in FIG. 8.

In the third embodiment, an elastic rubber component 65 of cylindrical configuration is provided between a pivot 63 and lever 64. This elastic rubber 65 is provided coaxially with the wiper arm rotational centerline m so as to absorb fluctuations in the rotational force in the direction of the wiper arm rotational centerline m between the pivot 63 and lever 64.

During wiping operation, a shaft 66 fixed to the rod reciprocated by means of the motor rotates the lever 64 around the wiper arm rotational centerline m. This rotational force is conveyed to a shaft section 63a via the elastic rubber 65, and motive force is conveyed from the other end of the pivot 63 having this shaft section 63a to the arm head 12 via the mating hole 12a.

According to this third embodiment, an elastic rubber 65 which absorbs fluctuations in wiper arm rotational force is disposed between the pivot 63 and lever 64, and so there is effectiveness in alleviating screeching vibration of the wiper blade caused by variation in the coefficient of friction conveyed from the wiper blade. In this case, there is an advantage of allowing use of a conventional article. Moreover, because the elastic rubber is hidden within the vehicle body, it is effective when the first embodiment or second embodiment cannot be used because of circumstances involving appearance or space.

Figure 9:
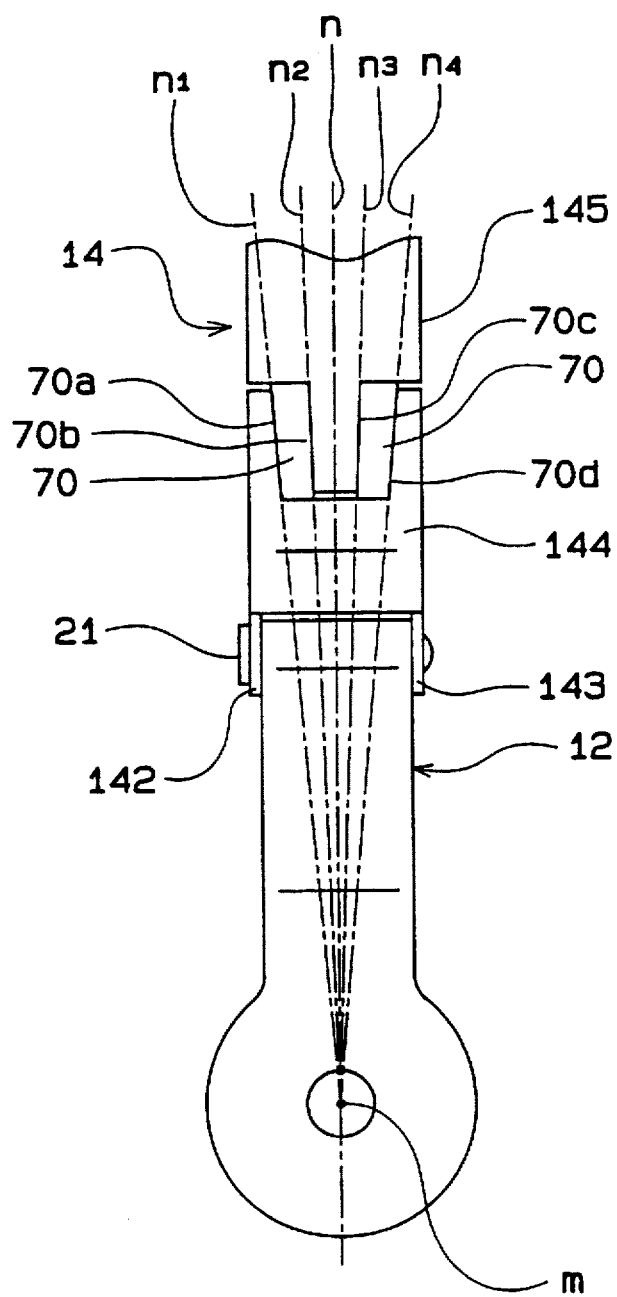
FIG. 9 is a partially plan view showing the major sections of a wiper apparatus for vehicles according to a fourth embodiment of the present invention.

A fourth embodiment of the invention is shown in FIG. 9.

The fourth embodiment shown in FIG. 9 is an embodiment wherein an elastic rubber component 70 is provided between a support section 144 and arm section 145 of the retainer 14.

Arms 142 and 143 of the support section 144 of the retainer 14 are rotatably attached to the end on the opposite side of the wiper arm rotational centerline m of the arm head 12. The elastic rubber 70 is provided at the end of the support section 144 of the retainer 14. This elastic rubber 70 is formed with tilted surfaces 70a, 70b, 70c, and 70d, and the extension lines $n_1$, $n_2$, $n_3$, and $n_4$, indicating the extension line direction of the tilted surfaces 70a, 70b, 70c, and 70d pass along the wiper arm rotational centerline m.

According to this fourth embodiment, when screeching vibration is generated between the wiper blade and window, the elastic rubber 70 deforms. At this time, because the elastic rubber 70 deforms so that the wiper arm axial centerline n passes through or near the wiper arm rotational centerline m, vibration in the direction of rotation of the wiper arm is absorbed with good efficiency.

Figure 10:
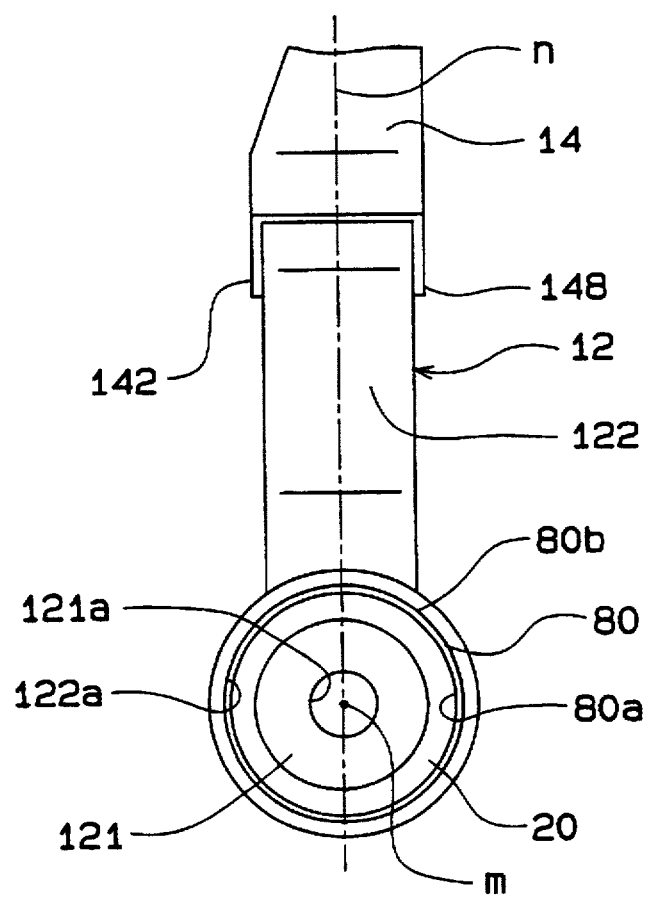
FIG. 10 is a partially plan view showing the major sections of a wiper apparatus for vehicles according to a fifth embodiment of the present invention.
Figure 11:
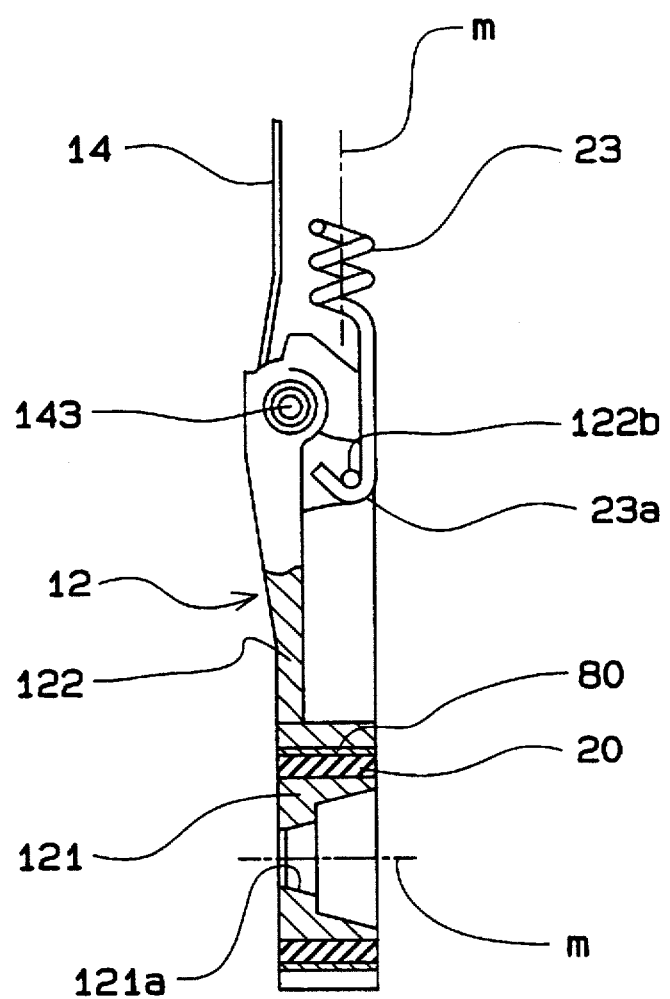
FIG. 11 is a partially cutaway side view showing the major sections of a wiper apparatus for vehicles according to a fifth embodiment of the present invention.
Figure 12:
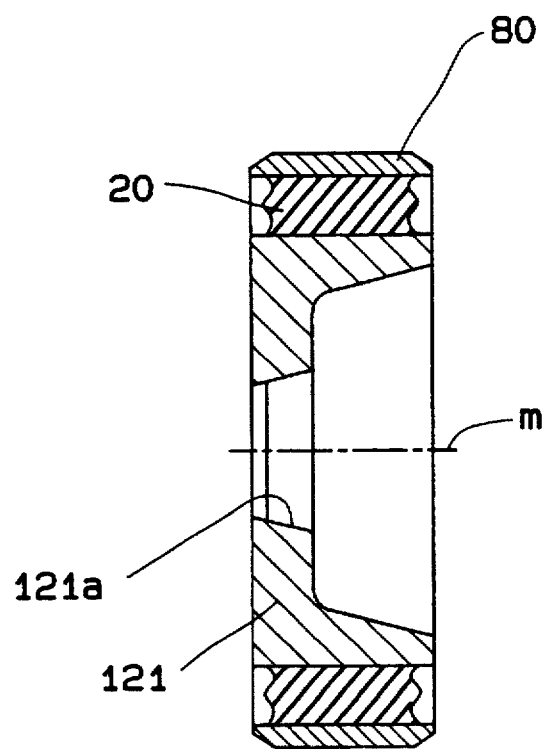
FIG. 12 is a sectional view showing the major sections of the arm head section of a fifth embodiment of the present invention.

A fifth embodiment of the invention is shown in FIG. 10 to FIG. 12.

The fifth embodiment shown in FIG. 10 to FIG. 12 is a modification of the first embodiment, and is an embodiment wherein an outer ring 80 is provided around an elastic rubber 20 of cylindrical configuration.

An outer wall of the elastic rubber 20 is sealed with an inner wall 80a of the outer ring 80, and an inner wall 122a of the arm section 122 of the arm head 12 is sealed and fixed to an outer wall 80b. The outer ring 80 is composed for example of iron, the elastic rubber 20 is composed, for example, of natural rubber, and the support section 121 forming the inner ring is composed, for example, of aluminum. The foregoing natural rubber uses an article with, for example, a hardness of 60 (torsional elastic constant of 60.8 kgf cm sec./deg. when acceleration vibration is 10 Hz and amplitude it 0.3 deg.; torsional damping coefficient of 0.27 kgf cm sec./deg. when at 23° C.). This outer ring 80 is press-fit and fixed between the elastic rubber 20 and the inner wall 122a of the arm section 122 of the arm head 12.

According to the fifth embodiment shown in FIG. 10 to FIG. 12, because the outer ring 80 is contraction machined so as to radially compress the elastic rubber 20, the adhesive force between the elastic rubber 20 and the outer ring 80 increases and the fatigue strength of the elastic rubber increases, and so the bond with the arm head can be fixed securely so that sealing is greater, and screeching vibration of the arm head 12 is suppressed to a minimum by means of displacement of the direction of rotation of the elastic rubber 20 with respect to vibration caused by the swinging of the wiper arm, and durability is also obtained.

Figure 13:
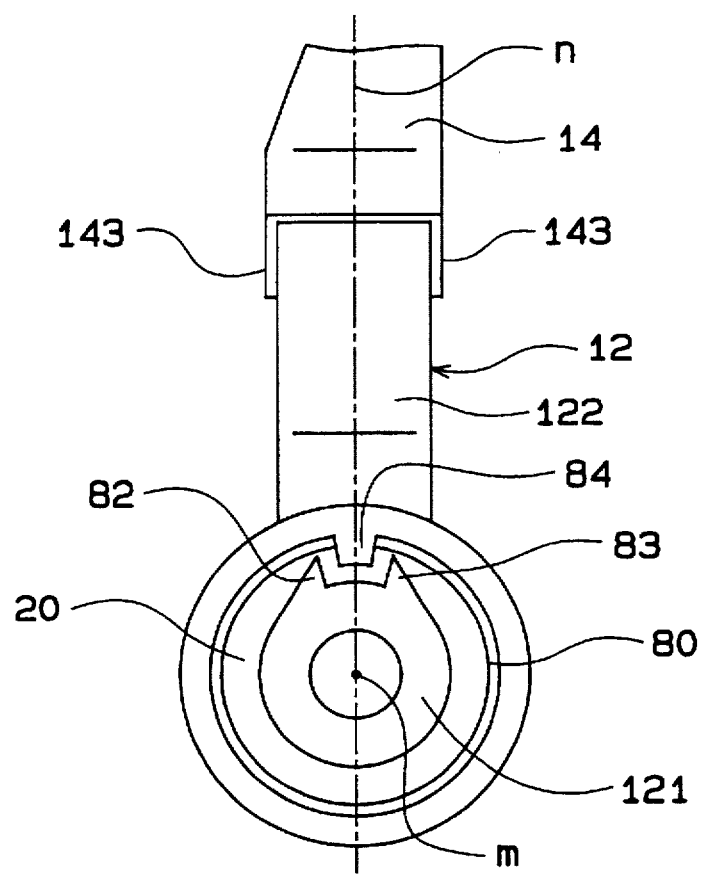
FIG. 13 is a plan view showing the major sections of a wiper apparatus for vehicles according to a sixth embodiment of the present invention.

A sixth embodiment of the invention is shown in FIG. 13.

The sixth embodiment shown in FIG. 13 is an embodiment wherein a function preventing excessive rotation of the wiper arm caused by a decline in the torsional elastic constant of the elastic rubber 20 has been improved.

Projections 82 and 83 of an acute-angle projection configuration are formed on the support section 121 of the arm head 12 at symmetrical positions with respect to the arm head centerline n. Furthermore, a projection 84 of trapezoidal configuration is formed on the inner wall side of the arm section 122 of the arm head 12 so as to extend between the foregoing projections 82 and 83. These projections 82, 83, and 84 function as stoppers restricting deformation of the elastic rubber 20.

According to the sixth embodiment, the possibility exists that the wiper arm may rotate excessively due to a decline in the torsional elastic constant of the elastic rubber 20 when at, for example, high temperature, but when such a possibility of excessive rotation of the wiper arm is high, the projections 82, 83, and 84 function to restrict deformation of the elastic rubber 20 so that the displacement of the relative angle of rotation of the arm section 122 with respect to the support section 121 does not become large, and so because fluctuations in the angle of rotation of the arm section 122 with respect to the support section 121 is alleviated, screeching vibration of the wiper arm can be effectively alleviated.

A seventh embodiment of the invention ms shown in FIG. 14 to FIG. 17.

The seventh embodiment is an embodiment wherein an elastic rubber component 90 is press-fit and secured to a link section of the first rod 4a and second rod 4b and the lever 5 of the first embodiment shown in FIG. 3.

Figure 14:
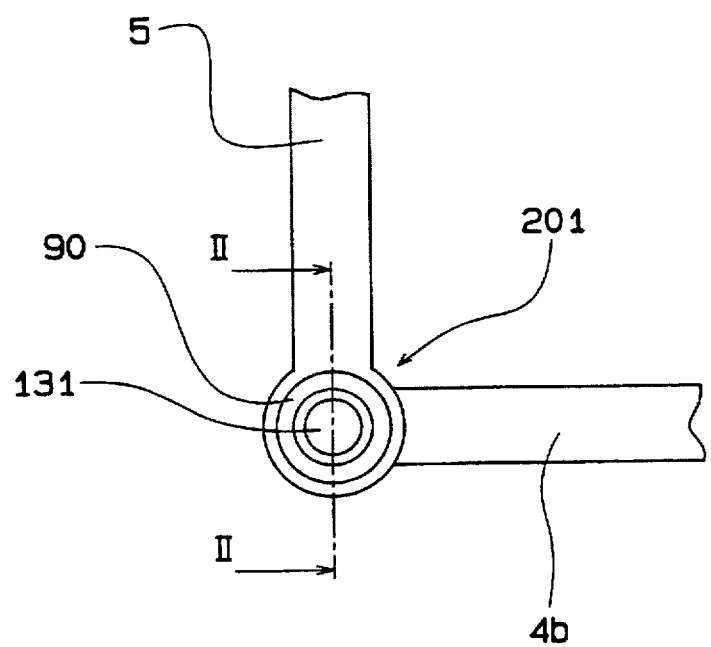
FIG. 14 is a plan view showing the major sections of the driver's seat side of a wiper apparatus for vehicles according to a seventh embodiment of the present invention.
Figure 15:
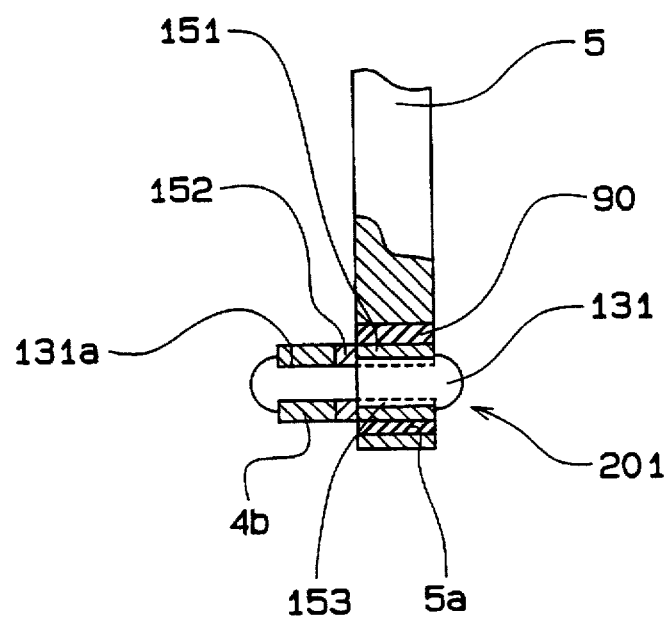
FIG. 15 is a sectional view taken along line II—II of FIG. 14.

As shown in FIG. 14 and FIG. 15, the lever 5 of the driver's seat side and the reciprocal second rod 4b are joined at a link section 201 by means of a pin 131. The second rod 4b is slidably mated with a groove 131a of annular configuration formed on the outer periphery on one side in the axial direction of the pin 131. A spline tooth 153 is formed on the outer periphery on the other side of the pin 131, an inner ring 151 is splined to this spline tooth 153, and the elastic rubber 90 of tubular configuration is press-fit and secured on the outer periphery of the inner ring 131.

Furthermore, an inner wall 5a of the lever 5 is sealed to the outer wall of the elastic rubber 90 at the outer periphery of this elastic rubber 90.

Moreover, as is shown in FIG. 16 and FIG. 17, the lever 5 of the passenger seat side and the reciprocal first rod 4a and second rod 4b are joined at a link section 202 by means of a pin 141. Grooves 141a and 141b of annular configuration are formed on the outer periphery at both ends in the axial direction of the pin 141. The first rod 4a is slidably mated with the groove 141a and the second rod 4b is slidably mated with the groove 141b. A spline tooth 164 is formed at the center of the pin 141, and an inner ring 161 is splined to this spline tooth 164. The elastic rubber 90 of tubular configuration is press-fit and secured on the outer periphery of the inner ring 161. Furthermore, an inner wall 5a of the lever 5 is sealed to the outer wall of the elastic rubber 90 at the outer periphery of this elastic rubber 90.

During wiping operation, the first rod 4a and second rod 4b reciprocated by means of a motor slide along the pins 131 and 141 at the link sections 201 and 202, and this reciprocating motion is conveyed to the lever 5 via the elastic rubber 90. Motive force is then conveyed from the lever 5 to the arm head, and the wiper blade reciprocates.

In the seventh embodiment, elastic rubber 90 is press-fit and fixed at the two respective link sections of the first rod 4a and second rod 4b and the levers 5, but it is moreover possible to press-fit and fix an elastic rubber at the link section of an eccentric plate and the first rod 4a. Furthermore, screeching vibration can be reduced even if elastic rubber 90 is press-fit and fixed at one or two of the foregoing three link section locations.

An eighth embodiment of the invention is shown in FIG. 18 and FIG. 19.

An elastic rubber component 172 is baked or bonded and fixed on the outer periphery of a support section 171 of an arm head not illustrated so that the centerline m of the elastic rubber 172 coincides with the rotational center of a wiper arm not illustrated, and a concavity 172a having a bottom and a flattened "L" configuration is formed substantially peripherally on this elastic rubber 172. An outer ring 173 is baked or bonded and fixed between an inner wall of an arm section of the arm head and the elastic rubber 172, and an inner wall 173a of the outer ring 173 is sealed to the outer wall 172b of the elastic rubber 172.

During wiping operation, in the case where the torsional displacement of the elastic rubber 172 due to displacement of the wiper arm is small, the concavity 172a also deforms in accompaniment to the torsional displacement of the elastic rubber 172, but because the inner walls 172c of the concavity 172a does not make contact, rigidity declines by the amount of the void in the elastic rubber 172 caused by the concavity 172a, and the elastic constant is lowered. When the torsional displacement of the elastic rubber 172 becomes large and inner walls 172c of the concavity 172a make contact, the rigidity of the elastic rubber 172 increases and the elastic constant rises.

In the eight embodiment, in the case where the displacement of the wiper arm is small, the elastic rubber 172 is susceptible to torsional displacement because the elastic constant of the elastic rubber 172 is small, and so screeching vibration is reduced even better than with the first embodiment. When the displacement of the wiper arm becomes large, the increase in the elastic constant of the elastic rubber 172 causes the elastic rubber 172 to become less susceptible to torsional displacement, suppressing excessive displacement of the wiper arm. By means of this, when the elastic rubber 172 is susceptible to displacement, such as in a case of high ambient temperature or in a case of heavy weight of the wiper arm, the elastic constant rises because the inner walls 172c of the concavity 172a of the elastic rubber 172 make contact, and overrun of the wiper arm can be prevented. Moreover, by adjusting the configuration and size of the concavity 172a, it is possible to make application to wiper arms of differing weight.

In the eighth embodiment, a void is formed by a concavity 172a having a bottom, but according to the present invention it is possible to form a void by providing a through-hole which passes through the elastic rubber.

A ninth embodiment of the invention is shown in FIG. 20. Identical symbols are used for items of fundamentally identical construction with the eighth embodiment.

Concavities 181a are formed at respective positions of 90 degrees along the radial direction of an elastic rubber component 181 of tubular configuration. In a manner similar to the eighth embodiment, during wiping operation, in the case where displacement of the wiper arm is small, the elastic constant of the elastic rubber 181 becomes small, and when displacement of the wiper arm becomes larger, the elastic constant of the elastic rubber 181 becomes larger.

In the ninth embodiment, a plurality of concavities comparatively smaller than in the eighth embodiment are formed, but by adjusting the number, configuration, size, and the like of the concavities, it is possible to apply the embodiment to to wiper arms of differing weight.

A tenth embodiment of the invention is shown in FIG. 21.

A support section 191 of the arm head is formed in a flattened cross configuration, and an elastic rubber component 192 is baked or bonded and fixed on the outer periphery of a support section 191. An outer ring 193 is baked or bonded and fixed between an inner wall of an arm section of the arm head and an outer wall 192a of the elastic rubber 192, and an inner wall 193a of the outer ring 193 is sealed to the outer wall 192a of the elastic rubber 192.

During wiping operation, accompanying displacement of the wiper arm, a protrusion 191a of the support section 191 and a protrusion 193b of the outer ring 193 compress the elastic rubber 192. Because of the characteristics of the rubber, the elastic constant of the elastic rubber 192 increases as the displacement of the direction of compression increases. That is to say, in the case where the displacement of the wiper arm is small, the elastic constant is small and so because the elastic rubber 192 is susceptible to displacement in the direction of compression, screeching vibration is reduced well. When the displacement of the wiper arm becomes large the elastic rubber 192 becomes less susceptible to displacement because the elastic constant increases, and excessive displacement of the wiper arm is prevented.

As has been described above, because a wiper apparatus for vehicles according to the present invention provides an elastic rubber so as to effectively absorb vibration in the rotational direction of a wiper arm, screeching vibration of the wiper arm is reduced, and so there is effectiveness in being able to effectively prevent unpleasant vibration or noise imparted to the driver or a passenger. Furthermore, because shock during return of the wiper arm is also absorbed, there is effectiveness not only in reducing return noise, but also in alleviating the load on arm itself.

What is claimed is:

1. A wiper apparatus for a vehicle, said apparatus comprising:

a wiper arm enabled to oscillate, said wiper arm having a joint;

a drive mechanism for driving said wiper arm;

a driving lever for conveying driving force from said drive mechanism to said wipper arm;

a wipper blade connected to said wiper arm and enabled to oscillate and slide over a surface of a window;

an inner member connected to said driving lever;

a spring, having first and second ends respectively connected to said wiper arm on opposite sides of said joint, for restricting movement of said wiper blade away from said window and for causing said wiper blade to press against said window; and an elastic body having a substantially cylindrical shape, said elastic body being disposed coaxially with a rotational center of said wiper arm, being fixed to an outer periphery of said inner member and being disposed between said inner member and said wiper arm, said elastic body having a damping characteristic which enables said elastic body to suppress self-induced vibrations of the entire wiper apparatus resulting from friction between said wiper blade and the surface of the window when said spring causes said wiper blade to press against said window by both conveying said driving force to said wiper arm and by being deformed in a rotational direction of said wiper arm, said elastic body further having a coefficient of elasticity which increases responsive to a force deforming said elastic body to a predetermined degree in said rotational direction of said wider arm.

2. A wiper apparatus for a vehicle according to claim 1, said apparatus further comprising an outer ring joined to an outer periphery of said elastic body, said outer ring being fixed in said wiper arm.

3. A wiper apparatus for a vehicle according to claim 2 wherein said outer ring is joined by one of a bonding technique and a baking technique.

4. A wiper apparatus for a vehicle according to claim 3, wherein said elastic body is compressed by said inner member and said outer ring.

5. A wiper apparatus for a vehicle, said apparatus comprising:

a wiper blade enabled to oscillate and slide over a surface of a window;

a drive mechanism for generating a driving force to drive said wiper blade across said window surface;

a linkage assembly for conveying said driving force from said drive mechanism to said wiper blade, said linkage assembly having a first portion which includes at least a first part of a wiper arm having an end connected to said wiper blade and a second part of the wiper arm pivotally supporting said first part, and a second portion which includes a rod having an end connected to said drive mechanism;

a spring having first and second ends respectively connected to said first and second parts of said wiper arm for restricting movement of said wiper blade away from said window and for causing said wiper blade to press against said window; and damping means, disposed in said linkage assembly at a connection between said first and second portions, for suppressing self-induced vibration of the entire wiper apparatus by both conveying said driving force to said wiper arm and by being deformed in a rotational direction of said wiper arm using a damping characteristic of said damping means which suppresses the self-excited vibration of the wiper apparatus resulting from friction between said wiper blade and the surface of the window when said spring causes said wiper blade to press against said window, said damping means including an elastic body having a coefficient of elasticity which increases responsive to a force deforming said elastic body to a predetemined degree in said rotational direction of said wiper arm.

6. A wiper apparatus for a vehicle according to claim 5, wherein said elastic body is a rubber bushing.

7. A wiper apparatus the a vehicle according to claims 5, 11 or 12 wherein said driving force is conveyed to said wiper arm via only said damping means.

8. A wiper apparatus for a vehicle according to claim 5 or 11 wherein:

said damping means has at least one interior surface defining a void; and the coefficient of elasticity of said elastic body varies according to expansion and contraction of said void.

9. A wiper apparatus for a vehicle according to claim 5 or 11, said apparatus further comprising restriction means for restricting displacement of said elastic body.

10. A wiper apparatus for a vehicle according to claim 5 or 11 wherein said coefficient of elasticity is increased when said damping means is deformed by compression in a rotational direction of said wiper arm.

11. The wiper apparatus for a vehicle according to claim 5, wherein:

said first portion includes an entire part of said wiper arm;

said drive mechanism drives said wiper arm around an axis of oscillation at said connection; and said damping means is concentrically disposed around said axis.

12. A wiper apparatus for a vehicle according to claim 11, wherein:

said second portion includes at least one additional rod having an end connected to said first portion at said connection;

said first and second portions are rotatable relative to one another about an axis at said connection; and said damping means is concentrically disposed about said connection.

13. The wiper apparatus of claim 5, wherein:

said second portion includes a second part of said wiper arm;

said drive mechanism drives said wiper arm in a direction of oscillation; and said damping means is deformable in said direction of oscillation.

* * * * *

UNITED STATES PATENT AND TRADEMARK OFFICE
CERTIFICATE OF CORRECTION

PATENT NO. : 5,735,015
DATED : April 7, 1998
INVENTOR(S) : Yoshida et al.

It is certified that error appears in the above-identified patent and that said Letters Patent is hereby corrected as shown below:

ON THE TITLE PAGE,

"[63] Continuation of Ser. No. 278,231, Jul. 27, 1994, abandoned."

should be

--[63] "Continuation of Ser. No. 278,231, Jul. 21, 1994, abandoned.--

Signed and Sealed this

Thirteenth Day of October 1998

Attest:

BRUCE LEHMAN

Attesting Officer

Commissioner of Patents and Trademarks